United States Patent
Matsuo

(10) Patent No.: US 7,508,458 B2
(45) Date of Patent: Mar. 24, 2009

(54) DIGITAL TELEVISION BROADCAST SIGNAL RECEIVER

(75) Inventor: Masahiro Matsuo, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 664 days.

(21) Appl. No.: 11/137,416

(22) Filed: May 26, 2005

(65) Prior Publication Data

US 2005/0278765 A1    Dec. 15, 2005

(30) Foreign Application Priority Data

May 26, 2004    (JP)    ............................... 2004-155571

(51) Int. Cl.
- H04N 17/00    (2006.01)
- H04N 17/02    (2006.01)
- H04N 5/44    (2006.01)
- H04N 5/50    (2006.01)
- H04B 7/10    (2006.01)
- H04B 1/18    (2006.01)
- H04B 17/00    (2006.01)
- H04L 1/02    (2006.01)

(52) U.S. Cl. ..................... 348/725; 348/180; 348/570; 348/731; 375/347; 455/161.3; 455/226.1

(58) Field of Classification Search ................. 348/180, 348/570, 725, 731, 909; 375/347; 455/132
See application file for complete search history.

(56) References Cited

U.S. PATENT DOCUMENTS

| | | | | |
|---|---|---|---|---|
| 5,561,673 A | * | 10/1996 | Takai et al. | 714/708 |
| 5,646,942 A | * | 7/1997 | Oliver et al. | 370/312 |
| 5,818,389 A | * | 10/1998 | Lazar | 342/383 |
| 6,792,258 B1 | * | 9/2004 | Nokes et al. | 455/277.2 |
| 6,982,745 B2 | * | 1/2006 | Miyabayashi | 348/193 |
| 7,215,382 B2 | * | 5/2007 | Bennett | 348/570 |
| 7,369,823 B2 | * | 5/2008 | Oiwa | 455/135 |
| 2001/0046271 A1 | * | 11/2001 | Jonas et al. | 375/347 |
| 2003/0228857 A1 | * | 12/2003 | Makei | 455/278.1 |
| 2004/0036772 A1 | * | 2/2004 | Pugel et al. | 348/180 |
| 2004/0105031 A1 | * | 6/2004 | Shibusawa | 348/570 |
| 2004/0248517 A1 | * | 12/2004 | Reichgott et al. | 455/63.4 |
| 2005/0034173 A1 | * | 2/2005 | Hatanaka | 725/151 |

(Continued)

FOREIGN PATENT DOCUMENTS

JP    07-007442    1/1995

*Primary Examiner*—Brian P Yenke
(74) *Attorney, Agent, or Firm*—Crowell & Moring LLP

(57) ABSTRACT

A digital TV broadcast signal receiver determines, as the best receiving direction, a receiving direction in which a digital TV broadcast signal can be accurately received. The digital TV broadcast signal receiver continuously scans all the receiving directions of a multi-directional antenna for each channel (S1), and demodulates received digital TV broadcast signals so as to detect BER values (S2), and also stores the detected BER values in a memory (S3). It further detects a minimum-error receiving direction or directions, among all the receiving directions, to give a minimum BER value, and determines whether or not there are multiple minimum-error receiving directions (S4). If there are multiple minimum-error receiving directions (YES in S4), it determines one of the minimum-error receiving directions as the best receiving direction for each channel with reference to BER values of receiving directions which are adjacent to the minimum-error receiving directions (S5 to S10).

9 Claims, 5 Drawing Sheets

U.S. PATENT DOCUMENTS

| | | | |
|---|---|---|---|
| 2005/0062667 A1* | 3/2005 | Shirosaka et al. | 343/794 |
| 2005/0264700 A1* | 12/2005 | Matsuo | 348/570 |
| 2006/0003693 A1* | 1/2006 | Onomatsu et al. | 455/3.02 |
| 2006/0015910 A1* | 1/2006 | Onomatsu et al. | 725/72 |
| 2006/0020987 A1* | 1/2006 | Onomatsu et al. | 725/100 |
| 2006/0020996 A1* | 1/2006 | Takagi et al. | 725/124 |
| 2006/0020997 A1* | 1/2006 | Onomatsu et al. | 725/134 |
| 2006/0023123 A1* | 2/2006 | Yen et al. | 348/705 |
| 2006/0028586 A1* | 2/2006 | Onomatsu et al. | 348/725 |
| 2006/0038923 A1* | 2/2006 | Dinwiddie | 348/569 |
| 2006/0055831 A1* | 3/2006 | Onomatsu | 348/725 |
| 2006/0125708 A1* | 6/2006 | Narita | 343/818 |
| 2006/0139499 A1* | 6/2006 | Onomatsu et al. | 348/725 |
| 2006/0209217 A1* | 9/2006 | Onomatsu et al. | 348/732 |
| 2006/0230429 A1* | 10/2006 | Van Horck | 725/135 |

* cited by examiner

FIG.5

| ch / Direction | 2ch | 4ch | 6ch | 8ch | 10 |
|---|---|---|---|---|---|
| D00 | $4 \times 10^{-8}$ | – | – | – | |
| D01 | 0 | – | – | – | |
| D02 | $7 \times 10^{-7}$ | – | – | – | |
| D03 | $3 \times 10^{-3}$ | $2 \times 10^{-7}$ | – | – | |
| D04 | – | 0 | – | – | |
| D05 | – | $1 \times 10^{-9}$ | – | – | |
| D06 | – | 0 | $3 \times 10^{-4}$ | – | |
| D07 | – | $3 \times 10^{-7}$ | $2 \times 10^{-7}$ | – | |
| D08 | – | – | 0 | – | |
| D09 | – | – | 0 | $5 \times 10^{-5}$ | |
| D10 | – | – | 0 | 0 | |
| D11 | – | – | $3 \times 10^{-8}$ | 0 | $3 \times$ |
| D12 | – | – | $5 \times 10^{-5}$ | 0 | 0 |
| D13 | – | – | – | 0 | $2 \times$ |
| D14 | – | – | – | $3 \times 10^{-6}$ | $3 \times$ |
| D15 | $5 \times 10^{-4}$ | – | – | – | $6 \times$ |

DIGITAL TELEVISION BROADCAST SIGNAL RECEIVER

BACKGROUND OF THE INVENTION

1. Field of the Invention

The present invention relates to a digital television (TV) broadcast signal receiver for receiving digital television broadcast signals such as ATSC (Advanced Television Systems Committee).

2. Description of the Related Art

In the North American Continent where ATSC digital television (hereafter often referred to simply as "TV broadcast" or "digital TV broadcast") is broadcast, big cities spread across the plains. Accordingly, digital TV broadcast signals, which are broadcast in big cities or their suburbs, can be received in other cities or intermediate areas between the cities. From the viewpoint of each TV user or viewer, digital TV broadcast signals come from various directions. Thus, it is necessary for the TV user to adjust the direction of an antenna in the direction of a transmission tower transmitting a TV broadcast signal of a TV program which the user wishes to watch.

For this reason, multi-directional antennas such as a so-called smart antenna are put to practical use. The EIA (Electronic Industries Association)-909 standard provides a smart antenna having sixteen equiangular receiving directions in 360 degrees. A digital TV broadcast signal receiver conforming to the EIA-909 standard is set to be able to adjust or switch an active signal receiving direction of the multi-directional antenna such as the smart antenna to every one of the sixteen receiving directions.

Some of such digital TV broadcast signal receivers have an automatic scanning function to select the receiving direction of an antenna in which a digital TV broadcast signal of a channel selected by a TV user can be best received. This can be done by scanning the sixteen directions for each channel, and by setting the best receiving direction as a receiving direction for the channel, because usually the position of an antenna or a transmission tower of a broadcast station does not change. However, in countries like the United States of America, broadcast stations may go into bankruptcy while it is relatively easy to open new broadcast stations. Accordingly, channels which could not previously be received may become receivable, while channels which could previously be received may become unreceivable. Furthermore, the receiving conditions of digital TV broadcast signals may change due to newly built high rise buildings. For this reason, it may be necessary to reset the best receiving direction for the channel selected by the TV user.

Generally, a conventional digital TV broadcast signal receiver sets, as a best receiving direction for each channel, the direction in which the received digital TV broadcast signal shows the highest signal intensity among those in the channel. Note that it is known to determine the receiving direction of an antenna using the received signal intensities, as disclosed in e.g. Japanese Laid-open Patent Publication Hei 7-7442 which describes a method of controlling an antenna to automatically track a satellite.

However, the following problems still exist. If a huge construction such as a high rise building exists near a receiving antenna, a digital TV broadcast signal transmitted from a transmission tower in a certain receiving direction of the receiving antenna and reflected by the huge construction (reflected wave) may be superimposed on the digital TV broadcast signal transmitted directly from the transmission tower so as to form a combined signal. The combined signal may have a higher intensity than a digital TV broadcast signal transmitted directly from the transmission tower in another receiving direction of the receiving antenna which, without the reflected wave, would be primarily the best receiving direction of the receiving antenna. In such case, if the receiving direction of the receiving antenna in which the received digital TV broadcast signal of a channel shows the highest signal intensity among those in the channel is simply set to be the best receiving direction of the receiving antenna for the channel, then the digital TV broadcast signal in the receiving direction, as set to be the best, may be degraded due to the influence of so-called multipath because the reflected digital TV broadcast signal is superimposed on the digital TV broadcast signal transmitted directly from the transmission tower.

Usually, a digital TV broadcast signal receiver has an error correction function, whereby errors in the digital TV broadcast signal occurring during the transmission of the digital TV broadcast signal can be corrected to some extent. However, if the digital TV broadcast signal is heavily degraded, the errors may not be corrected. In addition, the signal intensity of the received signal in a digital TV broadcast signal receiver is not decisive in determining the best receiving direction if the digital TV broadcast signal can be received accurately and without errors. Thus, the receiving direction of the receiving antenna in which the received digital TV broadcast signal of a channel shows the highest signal intensity among those in the channel is not necessarily the best receiving direction in which the digital TV broadcast signal can be prevented from being degraded and can be accurately received.

SUMMARY OF THE INVENTION

An object of the present invention is to provide a digital TV broadcast signal receiver that, when connected to a multi-directional antenna, can determine, as a best receiving direction for each channel, a receiving direction in which a digital TV broadcast signal can be prevented from being degraded e.g. due to the influence of multipath and can be accurately received.

According to the present invention, we provide a digital television broadcast signal receiver connected to a multi-directional antenna having multiple receiving directions provided in a standard for receiving a television broadcast signal by making one of the multiple receiving directions active, the digital television broadcast signal receiver comprising: a control signal output means for outputting, to the multi-directional antenna, a control signal to command a receiving direction of the multi-directional antenna for receiving each television broadcast signal; a receiver circuit connected to the multi-directional antenna for receiving the television broadcast signal; a BER (Bit Error Rate) detection circuit for demodulating the television broadcast signal received by the receiver circuit and detecting a BER value of the received television broadcast signal; a memory for temporarily storing BER values detected by the BER detection circuit; and a receiving direction determining means for determining a best receiving direction for each receivable channel based on the BER values stored in the memory.

For determining the best receiving direction for a channel, using the receiving direction determining means, the control signal output means continuously outputs the control signal to the multi-directional antenna for continuously scanning all the receiving directions of the multi-directional antenna, wherein the BER detection circuit detects the BER values for the scanned receiving directions, while the memory stores the detected BER values for the scanned receiving directions, and wherein the receiving direction determining means determines, as the best receiving direction for the channel, a minimum-error receiving direction to give a minimum BER value among all the receiving directions based on the BER values stored in the memory.

According to the digital TV broadcast signal receiver of the present invention, the minimum-error receiving direction to give a minimum BER value for a channel is determined as the best receiving direction for the channel. Accordingly, in contrast to a conventional digital TV broadcast signal receiver which sets or determines a best receiving direction based on signal intensities of received digital TV broadcast signals, it is possible according to the present invention to determine, as the best receiving direction for each channel, a receiving direction in which a digital TV broadcast signal can be prevented from being degraded e.g. due to the influence of multipath and can be accurately received.

Preferably, the receiving direction determining means detects a minimum-error receiving direction or directions among all the receiving directions based on the BER values stored in the memory, and determines whether or not there are multiple minimum-error receiving directions, wherein in the case where there is one minimum-error receiving direction, the receiving direction determining means determines the one minimum-error receiving direction as the best receiving direction for the channel, and wherein in the case where there are multiple minimum-error receiving directions, the receiving direction determining means determines one of the minimum-error receiving directions as the best receiving direction for the channel with reference to BER values of receiving directions which are adjacent to the multiple minimum-error receiving directions.

Further preferably, in the case where there are multiple minimum-error receiving directions for determining the best receiving direction for a channel, the receiving direction determining means determines whether or not the multiple minimum-error receiving directions are adjacent to each other, wherein if the multiple minimum-error receiving directions are not adjacent to each other, the receiving direction determining means compares, with each other, BER values of receiving directions adjacent to the multiple minimum-error receiving directions, and determines, as the best receiving direction for the channel, one of the minimum-error receiving directions which is adjacent to the receiving direction to give the smaller one of the BER values, and wherein if the multiple minimum-error receiving directions are adjacent to each other, the receiving direction determining means determines one of the adjacent multiple minimum-error receiving directions as the best receiving direction for the channel.

Still further preferably, if the multiple minimum-error receiving directions are adjacent to each other for determining the best receiving direction for a channel, the receiving direction determining means further determines whether the number of minimum-error receiving directions is even or odd, wherein if the number of minimum-error receiving directions is odd, the receiving direction determining means determines the one in the middle of the odd number of minimum-error receiving directions as the best receiving direction, and wherein if the number of minimum-error receiving directions is even, the receiving direction determining means compares, with each other, BER values of receiving directions adjacent to and other than the even number of minimum-error receiving directions, and determines one of the middle two of the even number of minimum-error receiving directions as the best receiving direction, which one is closer, than the other, to the receiving direction to give the smaller one of the BER values.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5 is a table showing BER values, in sixteen receiving directions for each channel, to be stored in a memory of the digital TV broadcast signal receiver.

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
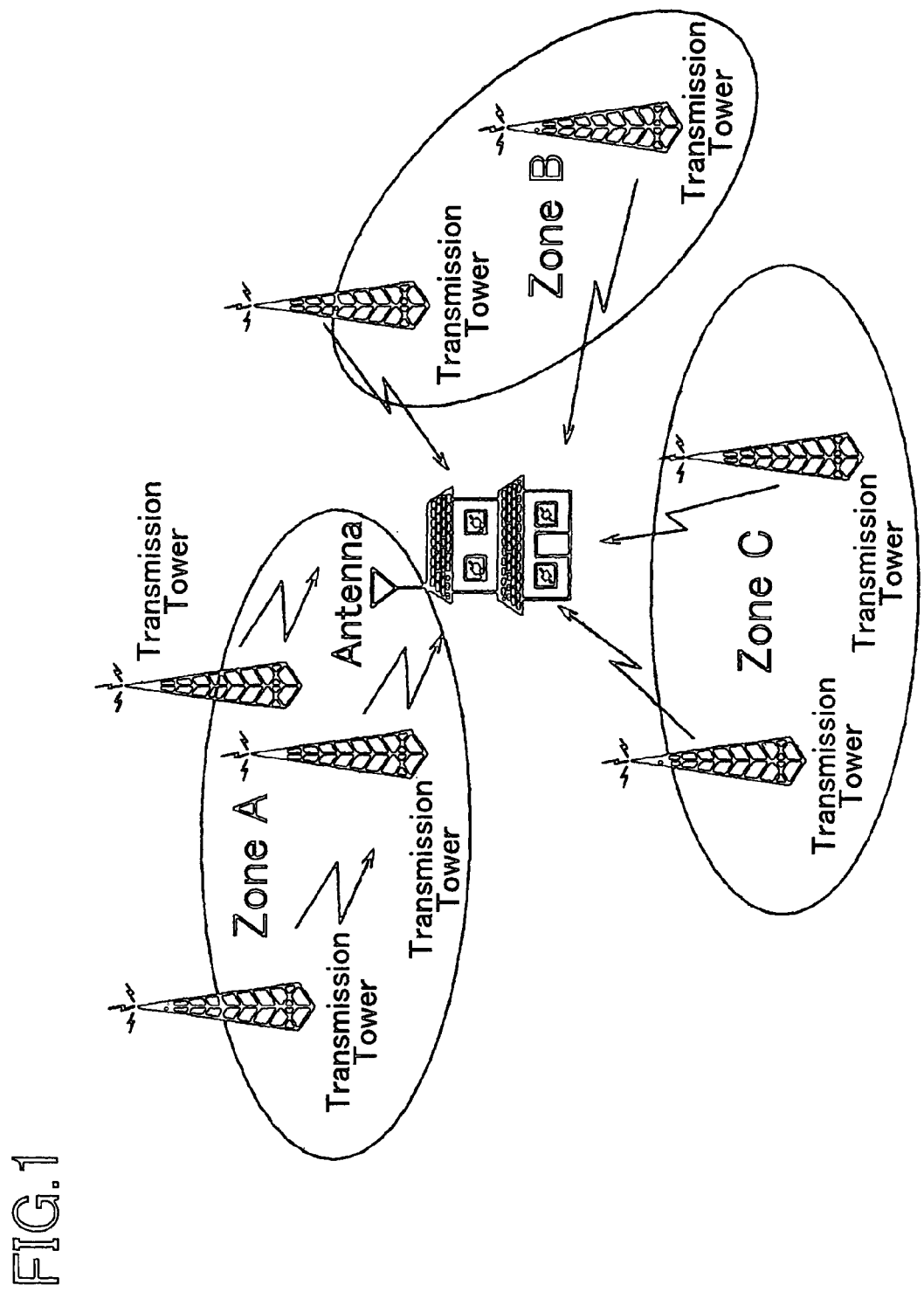
FIG. 1 is a schematic view showing a situation in which a user at home receives digital TV broadcast signals from transmission towers located in various zones.

A digital TV (Television) broadcast signal receiver according to an embodiment of the present invention will be described. FIG. 1 is a schematic view showing a situation in which a user at home receives digital TV broadcast signals from transmission towers located in various zones. Generally, if a digital TV broadcast signal receiver receives digital TV broadcast signals of digital (terrestrial) TV broadcast which have a signal intensity equal to or higher than a predetermined threshold value, it is possible to obtain images of a certain quality or higher, using error correction and the like. Here, it is assumed that the digital TV broadcast signal receiver in the home of the user can receive digital TV broadcast signals transmitted from transmission towers spreading across multiple locations e.g. in zone A, zone B and zone C, and that it is possible to view TV programs from the broadcast stations. A multi-directional antenna, called a smart antenna, having multiple receiving directions is put to practical use for such situation.

A multi-directional antenna can have various types such as one that changes the receiving direction by rotating the antenna using a motor, and one that selects an active antenna direction by turning on and off electronic switches. Further, the number of receiving directions of a multi-directional antenna can be not only sixteen as provided in the EIA-909 standard, but also eight or four to make a handy type, considering the needs of users, the price and so on.

Figure 2:
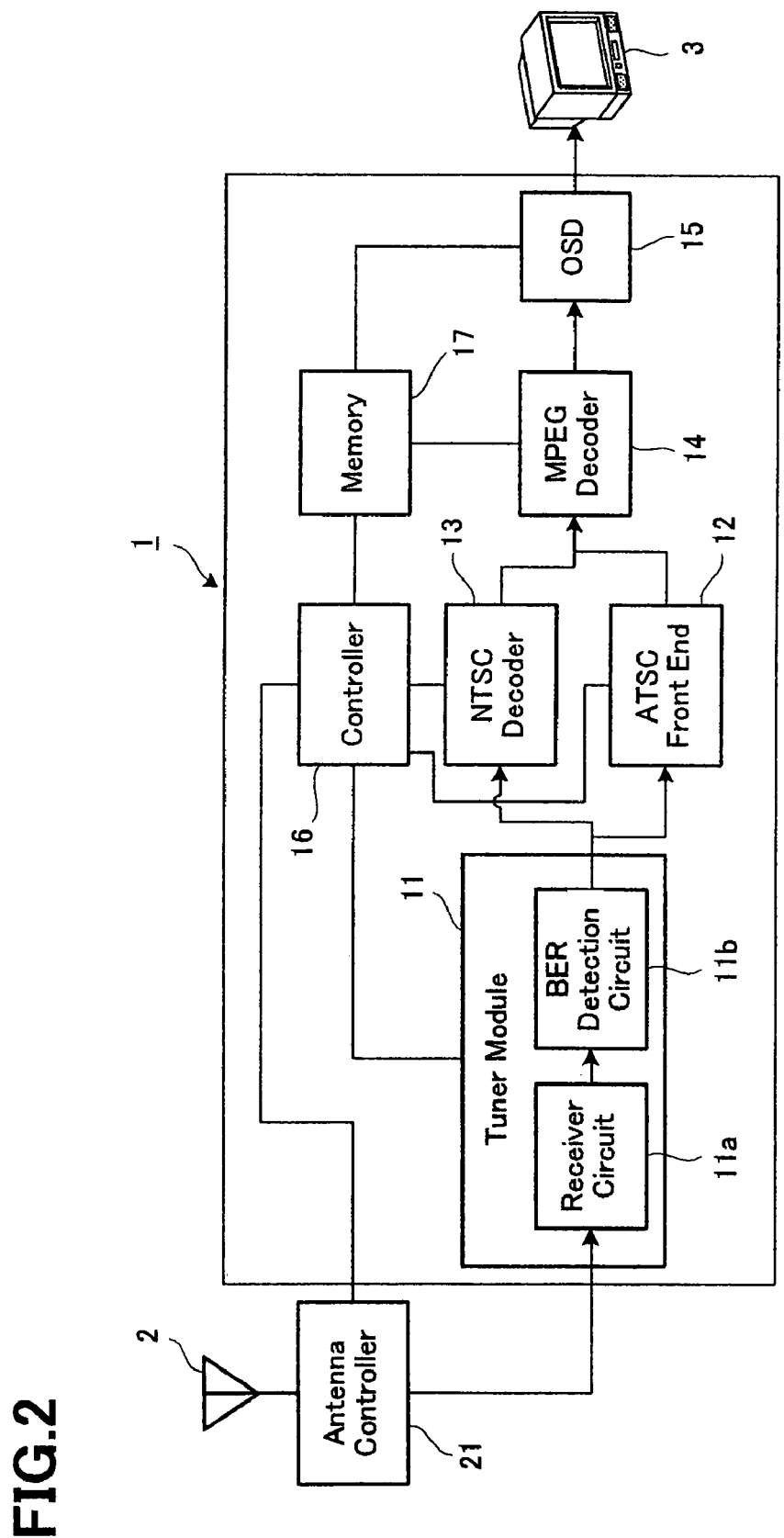
FIG. 2 is a schematic block diagram showing a digital TV broadcast signal receiver according to an embodiment of the present embodiment.

FIG. 2 schematically shows a digital TV broadcast signal receiver 1 according to the present embodiment. The digital TV broadcast signal receiver 1 is such a device that is connected to a multi-directional antenna 2 having multiple receiving directions, and receives a television broadcast signal by making one of the multiple receiving directions active. The digital TV broadcast signal receiver 1 comprises a tuner module 11, an ASTC (Advanced Television Systems Committee) front end 12, an NTSC (National Television System Committee) decoder 13, an MPEG (Motion Picture Experts Group) decoder 14, an on-screen display unit (OSD) 15, a controller (CPU) 16 and a memory 17.

The tuner module 11 is connected to the multi-directional antenna 2, and comprises: a receiver circuit 11*a* for selecting a signal of an assigned frequency and receiving a television broadcast signal; and a BER (Bit Error Rate) detection circuit 11*b* for demodulating the TV broadcast signal received by the receiver circuit 11*a* and detecting a BER value of the received TV broadcast signal. The ATSC front end 12 subjects the digital TV broadcast signal received by the tuner module 11 to predetermined signal processing, and decodes the received digital TV broadcast signal. The NTSC decoder 13 decodes analog TV broadcast signals received by the tuner module 11. The MPEG decoder 14 decodes the digital TV broadcast signal which is an MPEG-compressed signal. The digital TV broadcast signal decoded by the MPEG decoder 14 is output via the on-screen display unit 15 to a monitor device 3 for display. The on-screen display unit 15 superimposes a signal of a predetermined display image on the decoded digital TV broadcast signal.

The controller 16 serves as a control signal output means for detecting receiving conditions of digital TV broadcast signals received by the tuner module 11 and for outputting, to an antenna controller 21 of the multi-directional antenna 2, a control signal to command a receiving direction of the multi-directional antenna 2 for receiving each television broadcast signal so as to control the active receiving direction of the multi-directional antenna 2. The controller 16 further serves as a receiving direction determining means for performing a later described receiving direction determining process so as to determine an optimum or best receiving direction for each receivable channel based on BER values stored in the memory 17. Furthermore, the controller 16 controls the entire digital TV broadcast signal receiver 1 including the ATSC front end 12 and the NTSC decoder 13.

The memory 17 temporarily stores the BER values which the BER detection circuit 11*b* detects for all the receiving directions of the multi-directional antenna 2 that are scanned as described later. The memory 17 further stores each decoded digital TV broadcast signal, and also stores the signal of the display image to be superimposed on the decoded digital TV broadcast signal. Note that although the digital TV broadcast signal receiver 1 at the user site can send data to broadcast stations in digital TV broadcasting, description thereof is omitted herein because it does not directly relate to the present invention.

Based on the control signal from the controller 16, the antenna controller 21 of the multi-directional antenna 2 makes active commanded one of the multiple receiving directions of the multi-directional antenna 2. If the multi-directional antenna 2 is the type that changes the receiving direction by rotating the antenna using a motor, the antenna controller 21 controls the rotation of the motor so as to orient the antenna in the commanded direction. On the other hand, if the multi-directional antenna 2 is the type that selects an active antenna direction by turning on and off electronic switches, the antenna controller 21 turns on one of the electronic switches corresponding to the commanded direction, and turns off the other electronic switches.

Figure 3:
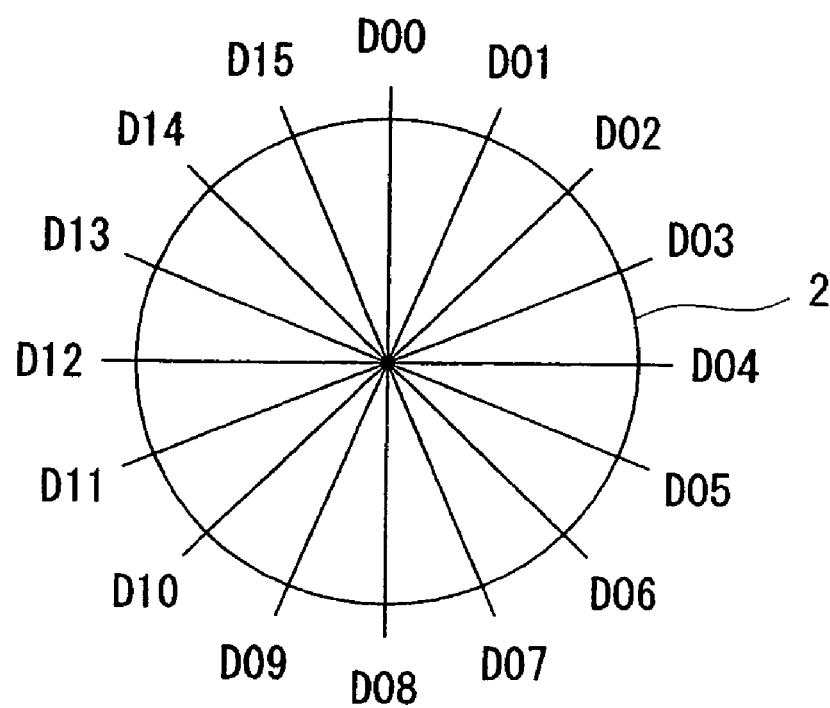
FIG. 3 is a chart showing multiple receiving directions of a multi-directional antenna connected to the digital TV broadcast signal receiver.

FIG. 3 is a chart showing multiple receiving directions of the multi-directional antenna 2. When connected to the multi-directional antenna 2, the digital TV broadcast signal receiver 1 according to the present embodiment receives, and measures receiving conditions of, digital TV broadcast signals coming from sixteen receiving directions provided in the EIA-909 standard as indicated by D00 to D15 in FIG. 3, respectively.

Figure 4:
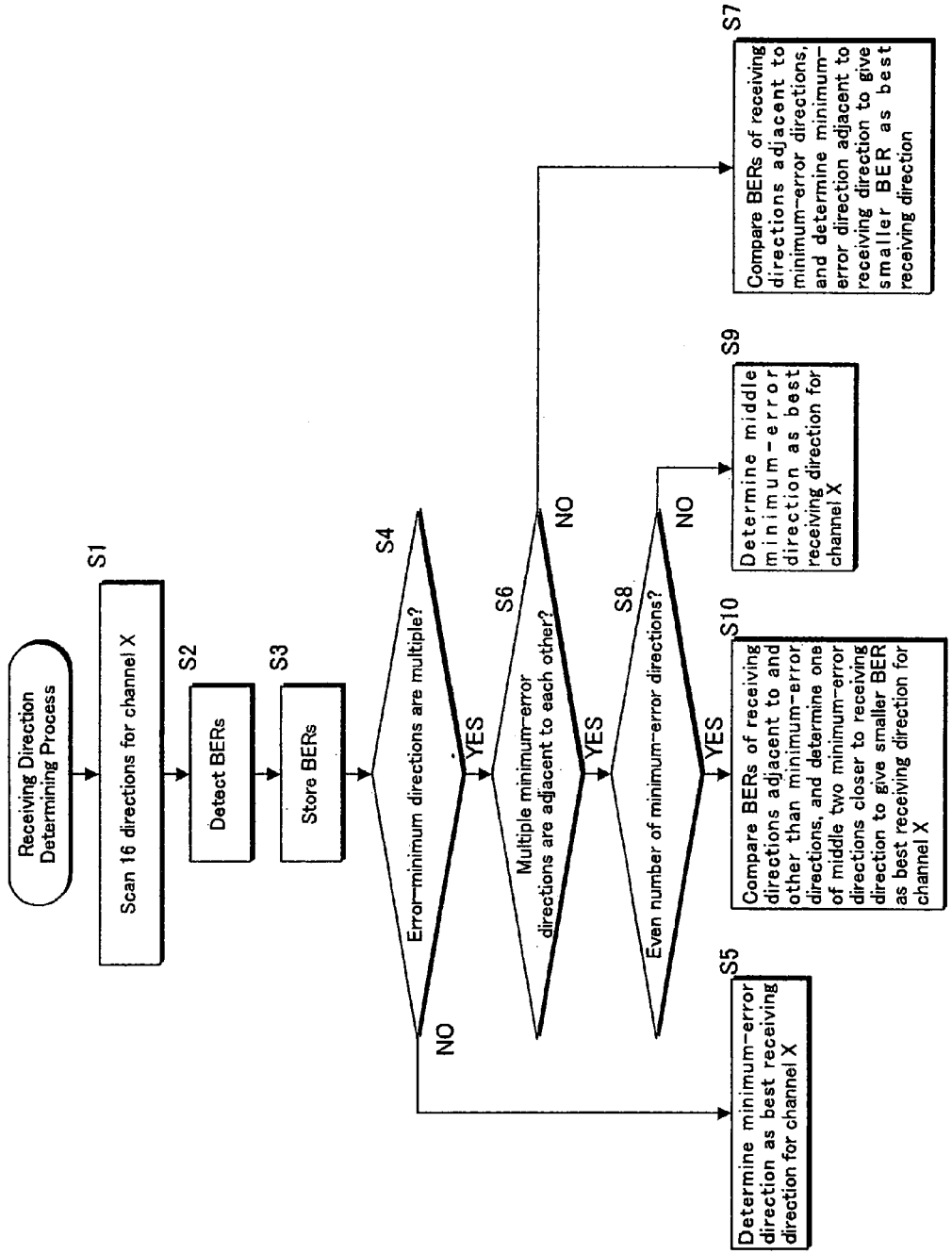
FIG. 4 is a flow chart showing a receiving direction determining process in the digital TV broadcast signal receiver.

Hereinafter, referring to FIG. 4 and FIG. 5, a receiving direction determining process performed by the controller 16 of the digital TV broadcast signal receiver 1 will be described. FIG. 4 is a flow chart showing the receiving direction determining process, while FIG. 5 is a table showing a BER value or values, to be stored in the memory 17, in each of the sixteen receiving directions in row for each channel in column.

Under the control of the controller 16, the digital TV broadcast signal receiver 1 continuously scans all the receiving directions of the multi-directional antenna 2 for a receivable channel X (S1), and further demodulates digital TV broadcast signals so as to detect BER values of the respective receiving directions for the channel X (S2), and also stores the detected BER values in the memory (S3). For continuously scanning all the receiving directions of the multi-directional antenna 2, the controller 16 (control signal output means) continuously outputs a control signal to the multi-directional antenna 2. The controller 16 (receiving direction determining means) detects a receiving direction or directions, among all the receiving directions D00 to D15, to give a minimum BER value for the channel X. In the present specification, the direction or directions to give a minimum BER value for the channel X is referred to as "minimum-error" receiving direction or directions for the channel X. The controller 16 further determines whether or not there are multiple minimum-error receiving directions (S4).

Now, based on the examples of BER values of respective channels stored in the memory 17 as shown in FIG. 5, the receiving direction determining process in the step 4 and subsequent steps will be described. Note that in FIG. 5, BER values of $1 \times 10^{-2}$ or greater are indicated by a dash "—". Further note that with a BER value of $3 \times 10^{-6}$ or smaller, images of a certain quality or higher can be obtained, using error correction and the like.

First, a process for 2ch (which is abbreviation of channel 2, with other channels 4, 6 and 8 being also abbreviated as 4ch, 6ch and 8ch) will be described. The controller 16 (receiving direction determining means) performs the steps 1 to 3, and further detects a minimum-error receiving direction or directions among all the receiving directions D00 to D15, and also determines whether or not there are multiple minimum-error receiving directions (S4). In the case of 2ch, the minimum-error receiving direction (which here is the receiving direction to give the BER value of zero "0") is one, i.e. the receiving direction D01 only (NO in S4). Accordingly, the controller 19 determines the receiving direction D01 as the best receiving direction for receiving 2ch (S5).

Next, a process for 4ch will be described. The controller 16 performs the steps 1 to 3, and further detects a minimum-error receiving direction or directions among all the receiving directions D00 to D15, and also determines whether or not there are multiple minimum-error receiving directions (S4). In the case of 4ch, the BER value is 0 in both the receiving direction D04 and the receiving direction D06, so that there are multiple minimum-error receiving directions (YES in S4). The controller 16 (receiving direction determining means) then determines whether the multiple minimum-error receiving directions are adjacent to each other (S6). In this case, the receiving direction D04 and the receiving direction D06 are not adjacent to each other (NO in S6). The controller 16 then compares the sum of BER values of the receiving directions D03 and D05, which are adjacent to the receiving direction D04, with the sum of BER values of the receiving directions D05 and D07 which are adjacent to the receiving direction D06, thereby finding that the former sum is smaller than the latter sum, i.e. that the former sum is the smallest. The controller 16 determines, as the best receiving direction for receiving 4ch, one of the minimum-error receiving directions which one is adjacent to the smaller or smallest one of the sums of the adjacent BER values. Since the former sum is the smaller or smallest in this case as described above, the controller 16 determines the receiving direction D04 as the best receiving direction for receiving 4ch (S7).

Next, a process for 6ch will be described. The controller 16 performs the steps 1 to 3, and further detects a minimum-error receiving direction or directions among all the receiving directions D00 to D15, and also determines whether or not there are multiple minimum-error receiving directions (S4). In the case of 6ch, the BER value is 0 in each of the receiving directions D08 to D10, so that there are multiple minimum-error receiving directions (YES in S4). The controller 16 (receiving direction determining means) then determines whether the multiple minimum-error receiving directions are adjacent to each other (S6). In this case, the receiving directions D08 to D10 are adjacent to each other (YES in S6). In the case where the multiple minimum-error receiving directions are adjacent to each other, the controller 16 determines whether the number of minimum-error receiving directions is even or odd (S8). In the case of 6ch, the number of minimum-error receiving directions is odd (NO in S8). In the case where there are an odd number of minimum-error receiving directions, the controller 16 determines the one in the middle of the odd number of minimum-error receiving directions as the best receiving direction. Since the receiving direction D09 is the one in the middle of the odd number of minimum-error receiving directions D08 to D10 in this case, the controller 16 determines the receiving direction D09 as the best receiving direction for receiving 6ch (S9).

Next, a process for 8ch will be described. The controller 16 performs the steps 1 to 3, and further detects a minimum-error receiving direction or directions among all the receiving directions D00 to D15, and also determines whether or not there are multiple minimum-error receiving directions (S4). In the case of 8ch, the BER value is 0 in each of the receiving directions D10 to D13, so that there are multiple minimum-error receiving directions (YES in S4). The controller 16 (receiving direction determining means) then determines whether the multiple minimum-error receiving directions are adjacent to each other (S6). In this case, the receiving directions D10 to D13 are adjacent to each other (YES in S6). In the case where the multiple minimum-error receiving directions are adjacent to each other, the controller 16 determines whether the number of minimum-error receiving directions is even or odd (S8). In the case of 8ch, the number of minimum-error receiving directions is even (YES in S8). In the case where there are an even number of minimum-error receiving directions, the controller 16 compares, with each other, BER values of receiving directions which are adjacent to and other than the even number of minimum-error receiving directions, that are the receiving directions D10 to D13 in this case, so as to find the smaller or smallest one of the compared BER values. The controller 16 determines one of the middle two of the even number of minimum-error receiving directions as the best receiving direction, which one is closer, than the other, to the receiving direction as found by the above comparison to give the smaller or smallest one of the BER values (S10).

More specifically in this case, the controller 16 (receiving direction determining means) determines that among the four minimum-error receiving directions D10 to D13, the minimum-error receiving directions D10 and D13 are adjacent to the receiving directions D09 and D14, respectively, which are other than the minimum-error receiving directions, while the other minimum-error receiving directions D11 and D12 are not adjacent to receiving directions which are other than the minimum-error receiving directions. Then, the controller 16 compares the BER value of the receiving direction D09 with that of the receiving direction D14 in this case, thereby finding that the receiving direction D09 gives the smaller or smallest BER value. Further, the controller 16 determines that the middle two of the minimum-error receiving directions D10 to D13 are D11 and D12. The controller 16 then determines the minimum-error receiving direction D12 as the best receiving direction, which is closer, than the minimum-error receiving direction D11, to the receiving direction D09 as found by the above comparison to give the smaller the BER value than the receiving direction D14.

Under the control of the controller 16, the memory 17 stores the best receiving direction as determined above. When a user selects a channel, the controller 16 reads the stored best receiving direction from the memory 17, and outputs, to the antenna controller 21, a control signal which corresponds to, and is used for orienting the multi-directional antenna 2 in, the receiving direction as read from the memory 17.

As described in the foregoing, according to the digital TV broadcast signal receiver 1 of the present embodiment, the minimum-error receiving direction to give a minimum BER value for a channel is determined as the best receiving direction for the channel. Accordingly, in contrast to a conventional digital TV broadcast signal receiver which sets or determines a best receiving direction based on signal intensities of digital TV broadcast signals, it is possible according to the present embodiment to determine, as the best receiving direction for each channel, a receiving direction in which a digital TV broadcast signal can be prevented from being degraded e.g. due to the influence of multipath and can be accurately received.

According to the present embodiment, furthermore, when there are multiple minimum-error receiving directions for each channel, the best receiving direction for the channel is determined with reference to BER values of receiving directions which are adjacent to the minimum-error receiving directions for the channel as described above. Accordingly, it is possible to determine, as the best receiving direction for each channel, a receiving direction in which a good receiving condition can be maintained even when the direction of the multi-directional antenna 2 slips to some extent e.g. due to wind.

It is to be noted that the present invention is not limited to the above embodiments, and various modifications are possible. For example, in order to determine the best receiving direction for each channel in the case where there are multiple minimum-error receiving directions for the channel, other manners than those described above can be used as long as BER values of receiving directions adjacent to the minimum-error receiving directions for the channel are referenced in the receiving direction determining process.

The present invention has been described above using presently preferred embodiments, but such description should not be interpreted as limiting the present invention. Various modifications will become obvious, evident or apparent to those ordinarily skilled in the art, who have read the description. Accordingly, the appended. Claims should be interpreted to cover all modifications and alterations which fall within the spirit and scope of the present invention.

What is claimed is:

1. A digital television broadcast signal receiver connected to a multi-directional antenna having multiple receiving directions provided in a standard for receiving a television broadcast signal by making one of the multiple receiving directions active, the digital television broadcast signal receiver comprising:
   a control signal output means for outputting, to the multi-directional antenna, a control signal to command a receiving direction of the multi-directional antenna for receiving each television broadcast signal;
   a receiver circuit connected to the multi-directional antenna for receiving the television broadcast signal;
   a BER (Bit Error Rate) detection circuit for demodulating the television broadcast signal received by the receiver circuit and detecting a BER value of the received television broadcast signal;
   a memory for temporarily storing BER values detected by the BER detection circuit; and
   a receiving direction determining means for determining a best receiving direction for each receivable channel based on the BER values stored in the memory,
   wherein for determining the best receiving direction for a channel, using the receiving direction determining means,
      the control signal output means continuously outputs the control signal to the multi-directional antenna for continuously scanning all the receiving directions of the multi-directional antenna,
      the BER detection circuit detects the BER values for the scanned receiving directions, while the memory stores the detected BER values for the scanned receiving directions, and
      the receiving direction determining means determines, as the best receiving direction for the channel, a minimum-error receiving direction to give a minimum BER value among all the receiving directions based on the BER values stored in the memory,
   wherein for determining the best receiving direction for a channel, the receiving direction determining means detects a minimum-error receiving direction or directions among all the receiving directions based on the BER values stored in the memory, and determines whether or not there are multiple minimum-error receiving directions,
   wherein in the case where there is one minimum-error receiving direction, the receiving direction determining means determines the one minimum-error receiving direction as the best receiving direction for the channel, and
   wherein in the case where there are multiple minimum-error receiving directions, the receiving direction determining means determines one of the minimum-error receiving directions as the best receiving direction for the channel with reference to BER values of receiving directions which are adjacent to the multiple minimum-error receiving directions.

2. The digital television broadcast signal receiver according to claim 1,
   wherein in the case where there are multiple minimum-error receiving directions for determining the best receiving direction for a channel, the receiving direction determining means determines whether or not the multiple minimum-error receiving directions are adjacent to each other,
   wherein if the multiple minimum-error receiving directions are not adjacent to each other, the receiving direction determining means compares, with each other, BER values of receiving directions adjacent to the multiple minimum-error receiving directions, and determines, as the best receiving direction for the channel, one of the minimum-error receiving directions which is adjacent to the receiving direction to give the smaller one of the BER values, and
   wherein if the multiple minimum-error receiving directions are adjacent to each other, the receiving direction determining means determines one of the adjacent multiple minimum-error receiving directions as the best receiving direction for the channel.

3. The digital television broadcast signal receiver according to claim 2,
   wherein if the multiple minimum-error receiving directions are adjacent to each other for determining the best receiving direction for a channel, the receiving direction determining means further determines whether the number of minimum-error receiving directions is even or odd,
   wherein if the number of minimum-error receiving directions is odd, the receiving direction determining means determines the one in the middle of the odd number of minimum-error receiving directions as the best receiving direction, and
   wherein if the number of minimum-error receiving directions is even, the receiving direction determining means compares, with each other, BER values of receiving directions adjacent to and other than the even number of minimum-error receiving directions, and determines one of the middle two of the even number of minimum-error receiving directions as the best receiving direction, which one is closer, than the other, to the receiving direction to give the smaller one of the BER values.

4. A digital television broadcast signal receiver connected to a multi-directional antenna that receives a television broadcast signal by making one of the multiple receiving directions active, the digital television broadcast signal receiver comprising;
   a receiver circuit connected to the multi-directional antenna that receives the television broadcast signal;
   a Bit Error Rate (BER) detection circuit that detects a BER value of the received television broadcast signal;
   a memory that temporarily stores BER values detected by the BER detection circuit; and
   a controller that
      outputs, to the multi-directional antenna, a control signal to command a receiving direction of the multi-directional antenna for receiving each television broadcast signal, and
      determines a best receiving direction for each receivable channel based on the BER values stored in the memory,
   wherein the controller continuously outputs the control signal to the multi-directional antenna for continuously scanning all the receiving directions of the multi-directional antenna, and the BER detection circuit detects the BER values for the scanned receiving directions, while the memory stores the detected BER values for the scanned receiving directions,
   wherein the controller detects a minimum-error receiving direction or directions among all the receiving directions based on the BER values stored in the memory, and determines whether there are multiple minimum-error receiving directions, and wherein when the controller determines that there are multiple minimum-error receiving directions, the controller determines one of the minimum-error receiving directions as the best receiving direction for the channel with reference to BER values of receiving directions which are adjacent to the multiple minimum-error receiving directions.

5. The digital television broadcast signal receiver according to claim 4,
wherein when there are multiple minimum-error receiving directions for determining the best receiving direction for a channel, the controller determines whether the multiple minimum-error receiving directions are adjacent to each other, and
wherein when the multiple minimum-error receiving directions are not adjacent to each other, the controller compares, with each other, BER values of receiving directions adjacent to the multiple minimum-error receiving directions, and determines, as the best receiving direction for the channel, one of the minimum-error receiving directions which is adjacent to the receiving direction to give the smaller one of the BER values, and
wherein when the multiple minimum-error receiving directions are adjacent to each other, the controller determines one of the adjacent multiple minimum-error receiving directions as the best receiving direction for the channel.

6. The digital television broadcast signal receiver according to claim 5,
wherein when the multiple minimum-error receiving directions are adjacent to each other, the controller further determines whether the number of minimum-error receiving directions is even or odd,
wherein when the number of minimum-error receiving directions is odd, the controller determines the one in the middle of the odd number of minimum-error receiving directions as the best receiving direction, and
wherein when the number of minimum-error receiving directions is even, the controller compares, with each other, BER values of receiving directions adjacent to and other than the even number of minimum-error receiving directions, and determines one of the middle two of the even number of minimum-error receiving directions as the best receiving direction, which one is closer, than the other, to the receiving direction to give the smaller one of the BER values.

7. A method for determining a receiving antenna direction for a digital television broadcast signal receiver connected to a multi-directional antenna that receives a television broadcast signal, the method comprising:
continuously outputting, by a controller of the receiver, a control signal to the multi-directional antenna for continuously scanning all the receiving directions of the multi-directional antenna;
detecting bit error rate (BER) values for the scanned receiving directions;
storing the detected BER values for the scanned receiving directions in a memory;
detecting a minimum-error receiving direction or directions among all the receiving directions based on the BER values stored in the memory; and
determining whether there are multiple minimum-error receiving directions,
wherein when there are multiple minimum-error receiving directions, one of the minimum-error receiving directions is determined as the best receiving direction for the channel with reference to BER values of receiving directions which are adjacent to the multiple minimum-error receiving directions.

8. The method of claim 7, wherein when there are multiple minimum-error receiving directions for determining the best receiving direction for a channel, the method further comprises;
determining whether the multiple minimum-error receiving directions are adjacent to each other,
wherein when the multiple minimum-error receiving directions are not adjacent to each other, BER values of receiving directions adjacent to the multiple minimum-error receiving directions are compared with each other, and the best receiving direction for the channel is determined as one of the minimum-error receiving directions which is adjacent to the receiving direction to give the smaller one of the BER values, and
wherein when the multiple minimum-error receiving directions are adjacent to each other, the best receiving direction for the channel is determined as one of the adjacent multiple minimum-error receiving directions.

9. The method of claim 8, wherein when the multiple minimum-error receiving directions are adjacent to each other, the method further comprises:
determining whether the number of minimum-error receiving directions is even or odd,
wherein when the number of minimum-error receiving directions is odd, the one in the middle of the odd number of minimum-error receiving directions is determined as the best receiving direction, and
wherein when the number of minimum-error receiving directions is even, the BER values of receiving directions adjacent to and other than the even number of minimum-error receiving directions are compared to each other, and whichever one of the middle two of the even number of minimum-error receiving directions that is closer to the receiving direction to give the smaller one of the BER values is determined as the best receiving direction.

* * * * *